United States Patent
Yang

(10) Patent No.: US 9,598,004 B2
(45) Date of Patent: Mar. 21, 2017

(54) VEHICLE RUNNING BOARD

(71) Applicant: TAYIH LUN AN CO., LTD., Tainan (TW)

(72) Inventor: Chih-Yuan Yang, Tainan (TW)

(73) Assignee: TAYIH LUN AN CO., LTD., Shalun, Chung Sa Village, Anding Dist., Tainan (TW)

(*) Notice: Subject to any disclaimer, the term of this patent is extended or adjusted under 35 U.S.C. 154(b) by 0 days.

(21) Appl. No.: 14/820,524

(22) Filed: Aug. 6, 2015

(65) Prior Publication Data

US 2017/0036596 A1 Feb. 9, 2017

(51) Int. Cl.
*B60Q 1/24* (2006.01)
*B60Q 1/32* (2006.01)
*B60R 3/00* (2006.01)
*B60Q 1/26* (2006.01)

(52) U.S. Cl.
CPC ........... *B60Q 1/323* (2013.01); *B60Q 1/2696* (2013.01); *B60R 3/002* (2013.01)

(58) Field of Classification Search
CPC ..... B60Q 1/323; B60Q 3/0216; B60Q 1/0011
USPC .................................. 362/459–549
See application file for complete search history.

(56) References Cited

U.S. PATENT DOCUMENTS

| | | | |
|---|---|---|---|
| 5,915,830 A * | 6/1999 | Dickson | B60R 3/002 362/495 |
| 6,244,734 B1 * | 6/2001 | Hulse | B60Q 1/0011 362/495 |
| 6,250,785 B1 * | 6/2001 | Mallia | B60Q 1/323 362/495 |
| 6,382,819 B1 * | 5/2002 | McQuiston | B60R 3/002 362/487 |
| 2002/0054494 A1 * | 5/2002 | Ishiharada | B60K 37/02 362/487 |
| 2008/0037266 A1 * | 2/2008 | Cunnien | B60Q 1/323 362/495 |
| 2009/0044729 A1 * | 2/2009 | Navarre | B60P 1/43 362/495 |
| 2013/0201714 A1 * | 8/2013 | Huang-Tsai | B60Q 1/323 362/545 |
| 2015/0175059 A1 * | 6/2015 | Dellock | F21S 48/214 362/510 |
| 2015/0197180 A1 * | 7/2015 | Salter | F21S 48/214 362/510 |

(Continued)

*Primary Examiner* — William Carter

(57) ABSTRACT

A vehicle running board includes a main body, a decorative plate, a light-guiding rod provided with two LEDs, a covering strip, and a base. The main body has a first recessed surface at its top side and a second recessed surface at its underside, wherein the first recessed surface is provided with a plurality of oblong protrusions and defines a receiving groove, and the second recessed surface defines a receiving space for receiving a controller. The light-guiding rod is disposed in the receiving groove of the main body. The covering strip, having a plurality of raised light-transmissive portions, is fitted over the light-guiding rod. The decorative plate defines a plurality of oblong openings and is fixed onto the main body. The main body is fixed onto the base. The vehicle running board can provide a flickering mode of light at its top and a long strip of light at its one side, thus increasing safety.

5 Claims, 6 Drawing Sheets

(56) References Cited

U.S. PATENT DOCUMENTS

| | | | |
|---|---|---|---|
| 2015/0226403 A1* | 8/2015 | Dellock | B60Q 1/2611 |
| | | | 362/510 |
| 2016/0009220 A1* | 1/2016 | Salter | B60Q 1/323 |
| | | | 362/510 |
| 2016/0082879 A1* | 3/2016 | Kozole | B60Q 1/323 |
| | | | 362/544 |
| 2016/0121785 A1* | 5/2016 | Wang | B60Q 1/323 |
| | | | 362/511 |

\* cited by examiner

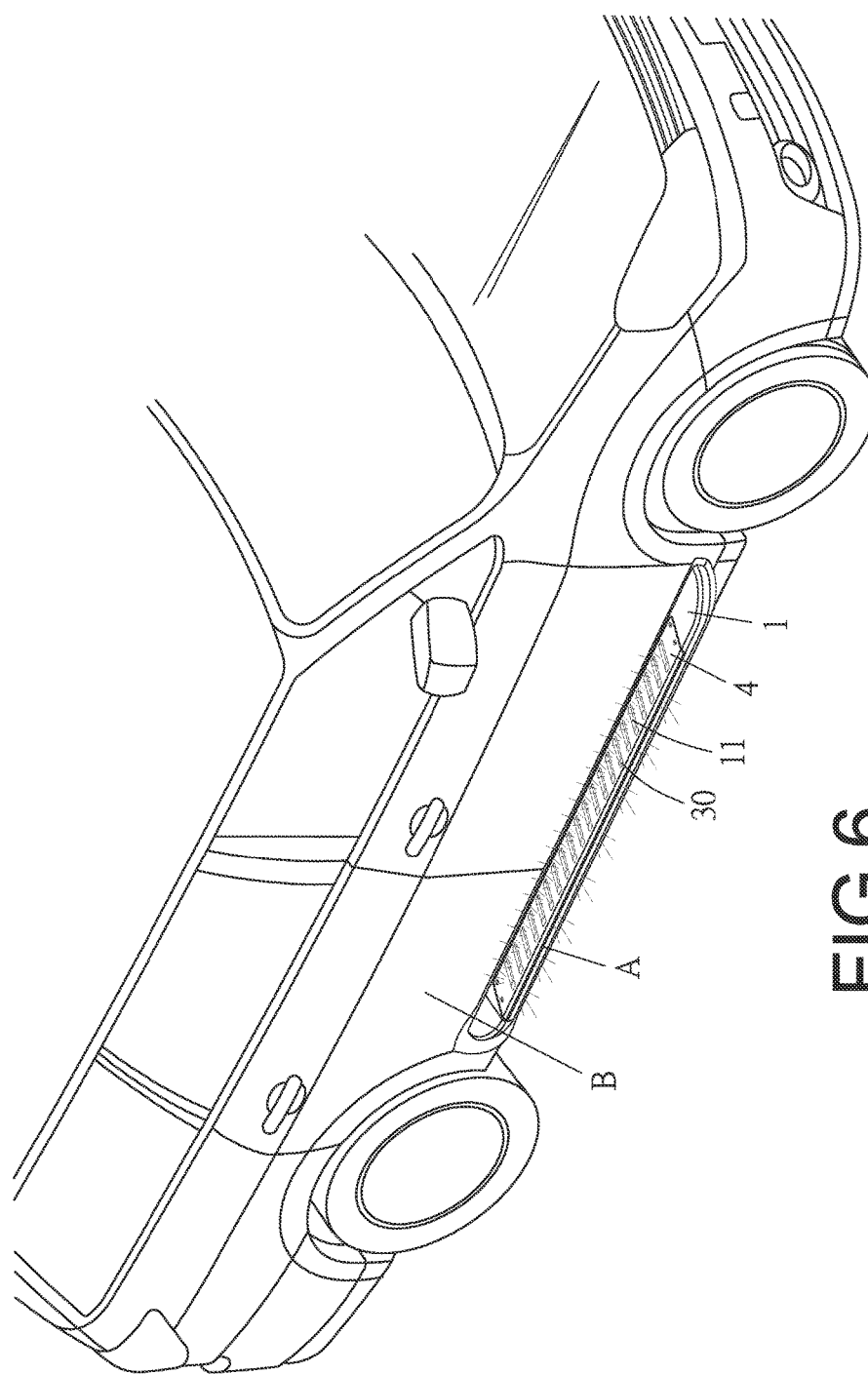

VEHICLE RUNNING BOARD

BACKGROUND OF THE INVENTION

1. Field of the Invention

This invention relates to a vehicle running board and, more particularly, to a vehicle running board capable of providing a flickering mode of light and a long strip of light for alerting a passenger and providing illumination, so as to increase safety in use.

2. Description of the Prior Art

Since a sport utility vehicle or a minivan is a comparatively high vehicle, it is always hard and inconvenient for passengers to get on or get off such a vehicle, especially for children, women in dresses or the aged persons unable to move freely. Therefore, a high vehicle would be assembled with two vehicle running boards at its two sides to aid entry into the vehicle. However, the two running boards of a conventional vehicle respectively protrude out from the vehicle body. As a result, if the vehicle was parked at a dim place or took a U-turn, it is not easy for the driver of the vehicle or the drivers of other vehicles to perceive the location of the vehicle running board. Or, failing in stepping on the running board may occur if the vehicle was parked at a dark place causing the passengers failing in perceiving the correct location and the width of the vehicle running board while getting on or off the vehicle.

SUMMARY OF THE INVENTION

The objective of this invention is to offer a vehicle running board which can be seen more clearly at night. The vehicle running board of the present invention includes a main body having a first recessed surface formed at a top side thereof and a second recessed surface formed at an underside thereof, and a decorative plate. A plurality of oblong protrusions are provided at the first recessed surface of the main body. A receiving groove is defined at the first recessed surface, next to the oblong protrusions of the main body, and a receiving space is defined at the second recessed surface of the main body. A light-guiding rod, which can be transparent, is disposed in the receiving groove of the main body. An LED is disposed at each of the two terminal ends of the light-guiding rod. A covering strip, which has a plurality of raised light-transmissive portions, is fitted over the light-guiding rod disposed in the receiving groove of the main body. The decorative plate defines a plurality of oblong openings and is fixed onto the main body, such that the oblong protrusions of the main body are inserted through the oblong openings of the decorative plate respectively, the raised light-transmissive portions of the covering strip are inserted into the oblong openings of the decorative plate and abut on the oblong protrusions of the main body respectively, and a slit is defined between one lateral edge of the decorative plate and one lateral edge of the first recessed surface of the main body.

The main body defines a plurality of top threaded holes at the first recessed surface thereof, and the decorative plate defines a plurality of through holes corresponding to the top threaded holes of the main body. A plurality of fasteners can be inserted through the through holes of the decorative plate and screwed into the top threaded hole of the main body, so that the decorate plate is firmly fixed onto the main body.

The main body defines a plurality of bottom threaded holes at the second recessed surface thereof, and the base defines a plurality of through holes corresponding to the bottom threaded holes of the main body. A plurality of fasteners can be inserted through the through holes of the base and screwed into the bottom threaded hole of the main body, so that the main body is firmly fixed onto the base.

The advantage of the present invention is that it has a beautiful appearance, like a piano's keyboards; moreover, it provides a warning signal to facilitate a passenger to step on the running board under dark light for entering or leaving a vehicle, and it provides illumination through a slit defined at one lateral side of the running board, thus increasing safety in use.

BRIEF DESCRIPTION OF DRAWINGS

This invention will be better understood by referring to the accompanying drawings, wherein:

FIG. 6 is a working view of the vehicle running board.

DETAILED DESCRIPTION OF THE PREFERRED EMBODIMENTS

Figure 1:
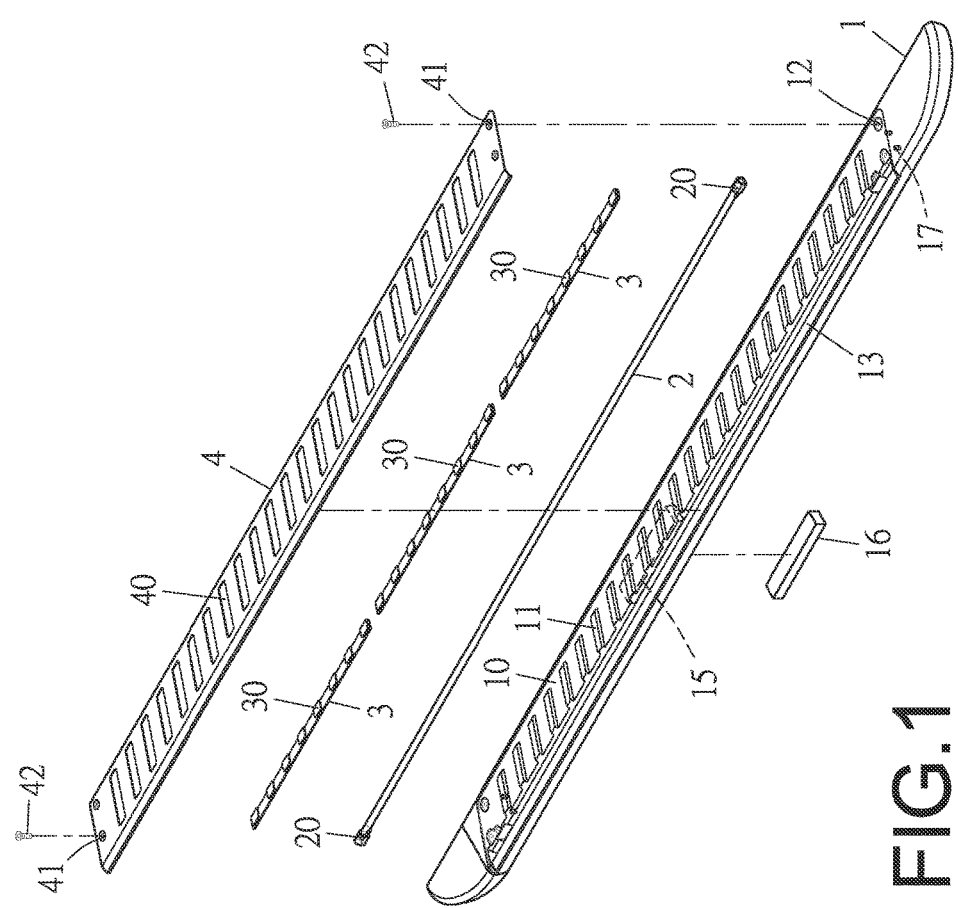
FIG. 1 is an exploded perspective view of a vehicle running board according to one embodiment of the present invention.
Figure 2:
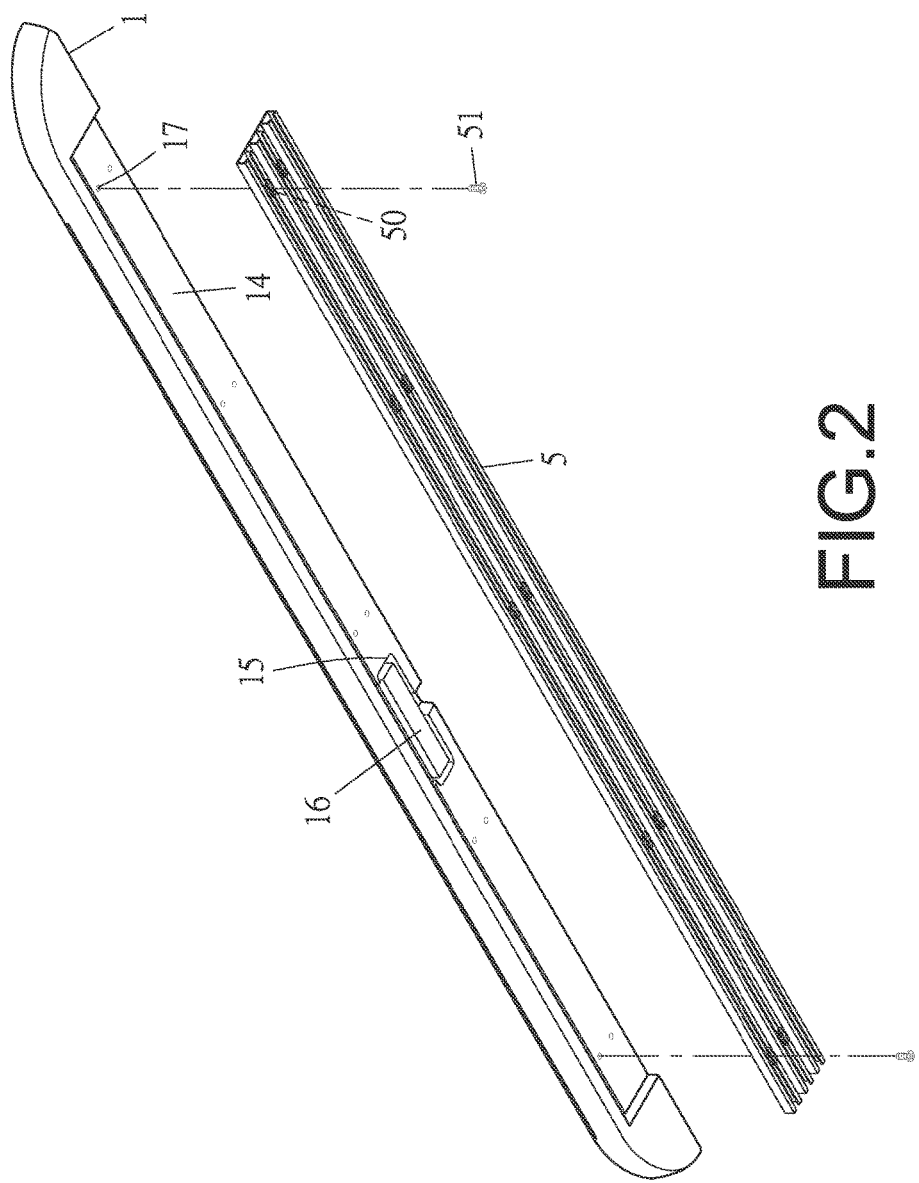
FIG. 2 is another exploded perspective view of the vehicle running board.
Figure 3:
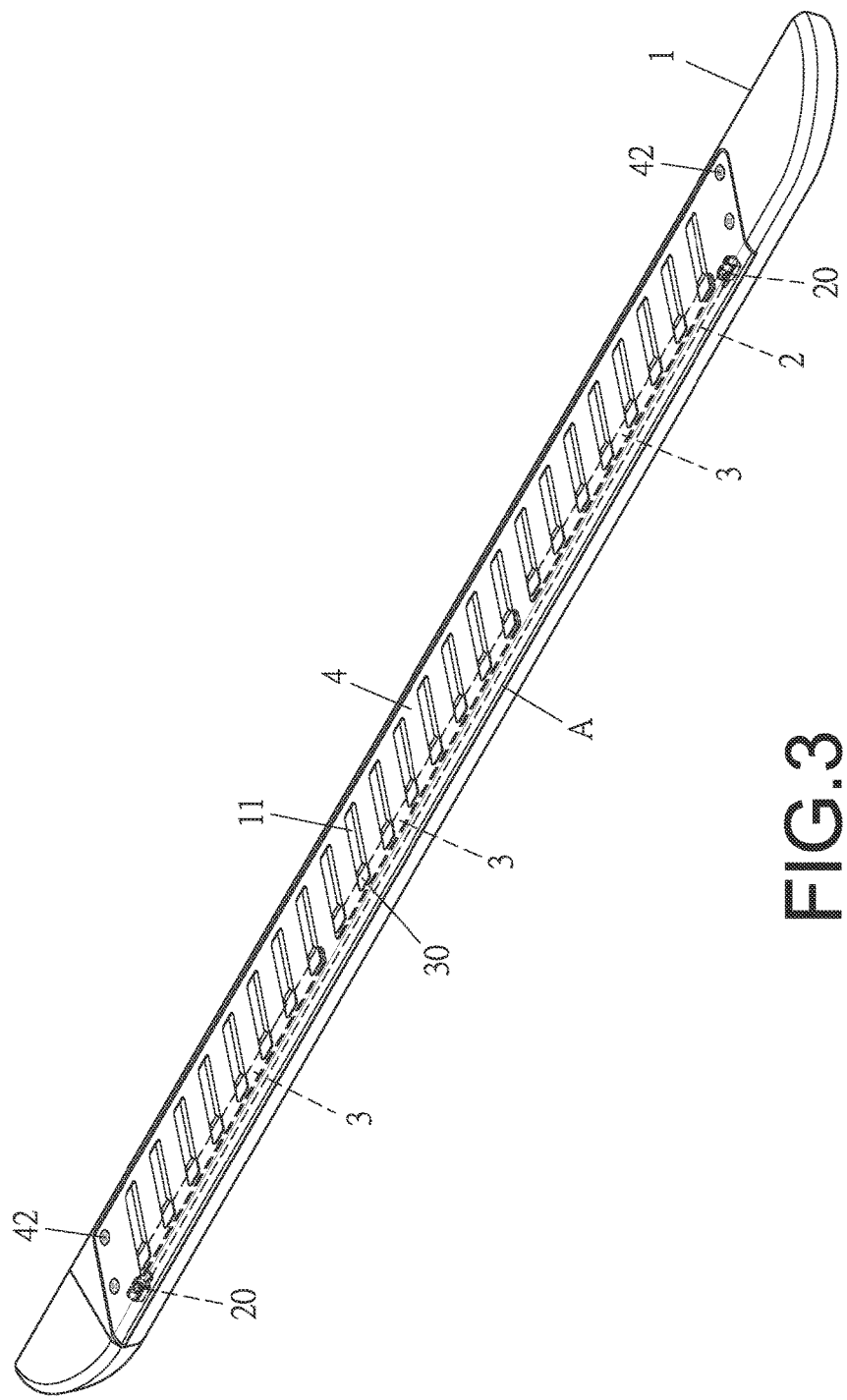
FIG. 3 is a perspective view of the vehicle running board.
Figure 4:
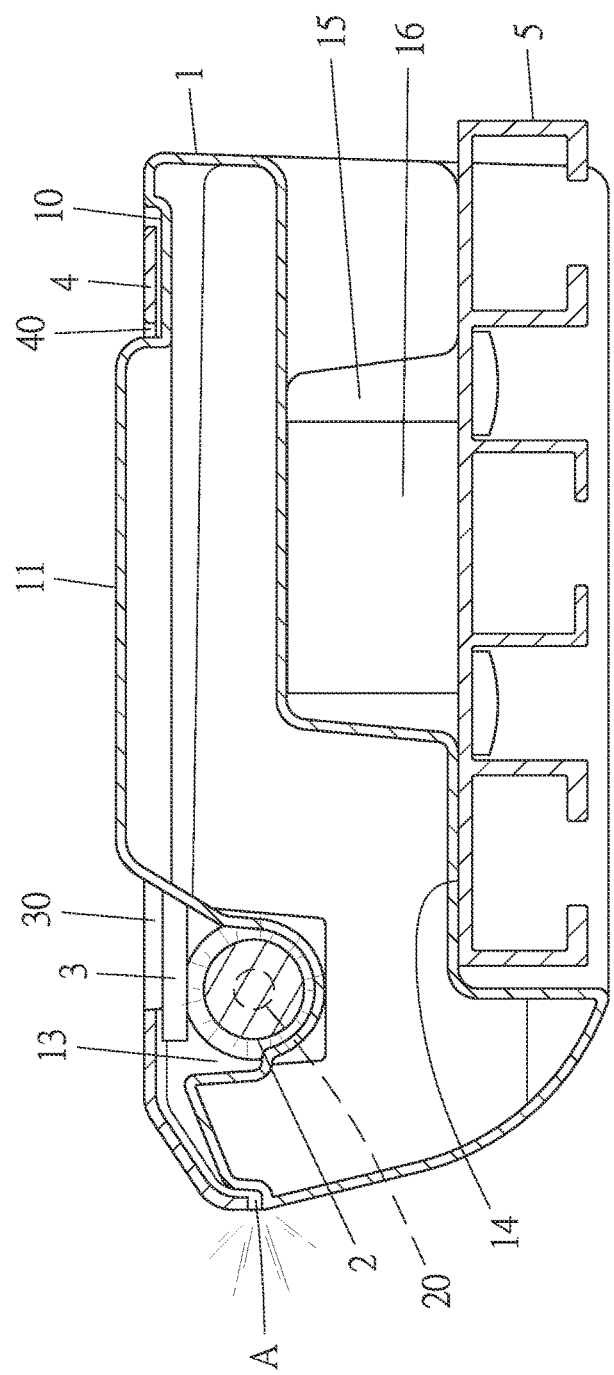
FIG. 4 is a cross-sectional view of the vehicle running board.
Figure 5:
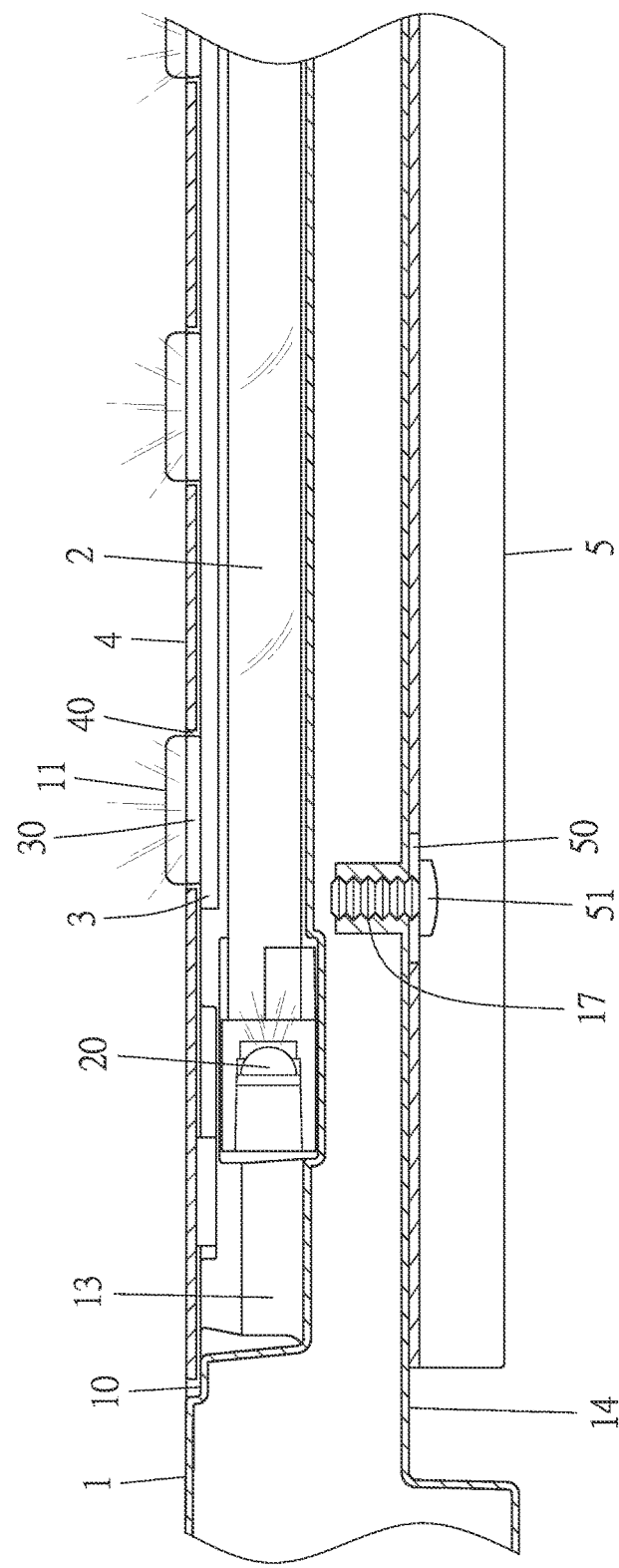
FIG. 5 is another cross-sectional view of the vehicle running board.

A preferred embodiment of a vehicle running board of the present invention, as shown in FIGS. 1~4, includes an elongated main body 1, a light-guiding rod 2, a covering strip 3, a decorative plate 4 and a base 5. The main body us provided at its top side with a first recessed surface 10, at which a plurality of oblong protrusions 11 are provided, and a receiving groove 13 extending along a longitudinal direction of the main body 1, next to the oblong protrusions 11, is defined, and a plurality of top threaded holes 12 are defined. Preferably, the oblong protrusions 11 are arranged at a predetermined angle to the longitudinal direction of the main body 1; in other words, the oblong protrusions 11 are neither parallel nor perpendicular to the longitudinal direction of the main body 1. Furthermore, as shown in FIG. 2, the main body 1 is provided at its underside with a second recessed surface 14, at which a receiving space 15 is defined for receiving therein a controller 16, and a plurality of bottom threaded holes 17 are defined. The light-guiding rod 2, which can be made of transparent material, is placed in the receiving groove 13 of the main body 1. An LED (light emitting diode) 20 is provided at each of two terminal ends of the light-guiding rod 2. The light-guiding rod 2 can guide the light rays emitting from the LEDs 20 to travel along its entire length. The covering strip 3, which has a plurality of raised light-transmissive portions 30, is fitted over the light-guiding rod 2. The decorative plate 4, which defines a plurality of oblong openings 40 corresponding to the oblong protrusions 11 of the main body 1, is fixed onto the first recessed surface 10 of the main body 1, such that the oblong protrusions 11 of the main body 1 are inserted through the oblong openings 40 of the decorative plate 4 respectively, and the raised light-transmissive portions 30 of the covering strip 3 are inserted into the oblong openings 40 of the decorative plate 4 and abut on the oblong protrusions 11 of the main body 1 respectively. The decorative plate 4 defines a plurality of through holes 41 corresponding to the top threaded holes 12 of the main body 1. A plurality of fasteners 42 can be inserted through the through holes 41 of the decorative plate 4 and screwed into the top threaded holes 12 of the main body 1, so that the decorative plate 4 is firmly fixed onto the main body 1. The base 5 defines a plurality of through holes 50 corresponding to the bottom threaded holes 17 of the main body 1. The main body 1 can be placed on the base 5, such that the second recessed surface 14 of the main body 1 is in contact with the top surface of the base 5, and a plurality of fasteners 51 are inserted through the through holes 50 of the base 5 and screwed into the bottom threaded holes 17 of the main body 1, so that the main body 1 is firmly fixed onto the base 5.

In assembly, referring to FIGS. 1~4, firstly, the light-guiding rod 2 is placed inside of the receiving groove 13 of the main body 1 and then the covering strip 3 is fitted over the light-guiding rod 2 such that the raised light-transmissive portions 30 abut on is the oblong protrusions 11 of the main body 1, respectively. Secondly, the decorative plate 4 is placed on the first recessed surface 10 of the main body 1, wherein the oblong protrusions 11 of the step 1 are inserted through the oblong openings 40 of the decorative plate 4 respectively, and the raised light-transmissive portions 30 of the covering strip 3 are inserted into the oblong openings 40 respectively. The fasteners 42 are able to be inserted through the through holes 41 of the decorative plate 4 and are able to be engaged with the top threaded holes 12 of the main body 1, so that the decorative plate 4 is fixed onto the first recessed surface 10 of the main body 1, and the covering strip 3 and the light-guiding rod 2 are firmly positioned inside of the receiving groove 13 of the main body 1. A slit (A) is formed between one lateral edge of the decorative plate 4 and one lateral edge of the first recessed surface 10 of the main body 1. The two LEDs 20 are provided with electrical wires (not shown) which are connected to the controller 16 accommodated in the receiving space 15 of the main body 1. Finally, the main body us placed on the base 5 such that the second recessed surface 14 of the main body 1 is in contact with the top surface of the base 5, and then the fasteners 51 are inserted through the through holes 50 of the base 5 and screwed into the bottom threaded holes 17 of the main body 1 so that the main body 1 can be firmly fixed onto the base 5.

In use, referring to FIGS. 3~6, when a vehicle B is started or a vehicle door is opened, the LEDs 20 at the two terminal ends of the light-guiding rod 2 can be turned on accordingly. The controller 16 can provide various operation modes, such as a regularly flicking mode or an intermittently flickering mode, for the LEDs 20. The flicking light rays emitting from the LEDs 20 can reach the inside of the light-guiding rod 2 and then can pass through the raised light-transmissive portions 30 of the covering strip 3 to serve as a warning signal. Furthermore, the slit (A), defined between the corresponding lateral edges of the decorative plate 4 and the first recessed surface 10 of the main body 1, allows the flicking light rays, which travels along the light-guiding rod 2, to pass therethrough to form a long strip of light, which can be used for illumination. The protrusions 11 protruding from the top of the decorative plate 4 are designed to prevent a passenger from slipping while stepping on the vehicle running board for getting in or out from the vehicle. With the flickering light rays on the top of the decorative plate 4 coming into sight, a passenger can step on the vehicle running board under poor light more easily and can prevent a passenger from colliding with the vehicle running board under poor light. In addition, the long strip of flickering light rays at one side of the vehicle running board can provide illumination. The oblong protrusions 11 at the top of the decorative plate 4 can provide an anti-slip function, so that a passenger can be prevented from slipping when getting on or off the vehicle. Thus, the vehicle running board of the present invention can insure safety in use.

While the preferred embodiment of the invention have been described above, it will be recognized and understood that various modifications may be made therein and that the appended claims are intended to cover all such modifications that may fall within the spirit and scope of the invention.

What is claimed is:

1. A vehicle running board, comprising:
  a base;
  a main body having a first recessed surface formed at a top side thereof and a second recessed surface formed at an underside thereof, the main body being fixed onto the base, with the second recessed surface in contact with a top surface of the base, wherein the main body is provided at the first recessed surface with a plurality of oblong protrusions and defines a receiving groove at the first recessed surface, next to the oblong protrusions, and defines a receiving space at the second recessed surface;
  a light-guiding rod provided with at least one LED at one end thereof and disposed in the receiving groove of the main body for guiding the light rays emitting from the LED;
  a covering strip fitted over the light-guiding rod and formed with a plurality of raised light-transmissive portions;
  a controller accommodated in the receiving space of the main body and electrically connected to the LED; and
  a decorative plate defining a plurality of oblong openings corresponding to the oblong protrusions of the main body and fixed onto the main body such that the oblong protrusions of the main body are inserted through the oblong openings of the decorative plate respectively, the raised light-transmissive portions of the covering strip are inserted into the oblong openings of the decorative plate and abut on the oblong protrusions respectively, and a slit is defined between one lateral edge of the decorative plate and one lateral edge of the first recessed surface of the main body;
  wherein the light rays emitting from the LED are capable of passing through the raised light-transmissive portions of the covering string and the slit between the decorative plate and the main body for alerting a passenger when getting on or off a vehicle and providing illumination, and the oblong protrusions extending out of the decorative plate arc capable of providing an anti-slip function, whereby the operational safety of the vehicle running board can be enhanced.

2. The vehicle running board as claimed in claim 1, wherein the light-guiding rod is provided at another end thereof with an LED electrically connected to the controller.

3. The vehicle running board as claimed in claim 2, wherein the oblong protrusions are arranged at a predetermined angle to a longitudinal direction of the main body.

4. The vehicle running board as claimed in claim 3, wherein the decorative plate defines a plurality of through holes, the main body defines a plurality of top threaded holes at the first recessed surface, and the decorative plate is fixed onto the main body by using a plurality of fasteners to pass through the through holes of the decorative plate to be screwed into the top threaded holes of the main body.

5. The vehicle running board as claimed in claim 3, wherein the base defines a plurality of through holes, the main body defines a plurality of bottom threaded holes at the second recessed surface, and the main body is fixed onto to the base by using a plurality of fasteners to pass through the through holes of the base to be screwed into the bottom threaded holes of the main body.

* * * * *